US008462299B2

(12) United States Patent
Isozaki et al.

(10) Patent No.: US 8,462,299 B2
(45) Date of Patent: Jun. 11, 2013

(54) REFLECTION TYPE LIQUID CRYSTAL DISPLAY DEVICE, DISPLAY APPARATUS, AND PROJECTION SYSTEM

(75) Inventors: Tadaaki Isozaki, Kanagawa (JP);
Shunichi Hashimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 495 days.

(21) Appl. No.: 11/069,369

(22) Filed: Mar. 1, 2005

(65) Prior Publication Data
US 2005/0231662 A1 Oct. 20, 2005

(30) Foreign Application Priority Data

Mar. 5, 2004 (JP) ................. P2004-061855

(51) Int. Cl.
*G02F 1/1335* (2006.01)
*G02F 1/1333* (2006.01)

(52) U.S. Cl.
USPC ................... 349/113; 349/5; 349/85

(58) Field of Classification Search
USPC ........................ 349/113–115, 5, 85
See application file for complete search history.

(56) References Cited

U.S. PATENT DOCUMENTS

| | | | | |
|---|---|---|---|---|
| 5,880,798 | A * | 3/1999 | Walton et al. | 349/99 |
| 6,621,550 | B1 * | 9/2003 | Arakawa et al. | 349/178 |
| 6,714,276 | B2 * | 3/2004 | Yamada et al. | 349/180 |
| 6,831,716 | B2 * | 12/2004 | Dozov et al. | 349/113 |
| 7,106,401 | B2 * | 9/2006 | Hashimoto et al. | 349/113 |
| 2002/0063818 | A1 * | 5/2002 | Anderson et al. | 349/96 |
| 2002/0070911 | A1 * | 6/2002 | Koma | 345/88 |
| 2003/0038908 | A1 * | 2/2003 | Ikeno et al. | 349/113 |
| 2004/0070716 | A1 * | 4/2004 | Ma et al. | 349/130 |
| 2004/0105038 | A1 * | 6/2004 | Hashimoto et al. | 349/5 |
| 2004/0165128 | A1 * | 8/2004 | Vithana | 349/113 |

FOREIGN PATENT DOCUMENTS

| | | | | |
|---|---|---|---|---|
| JP | 03/001285 A1 | 6/2002 | | |
| JP | 2002-268066 | 9/2002 | | |
| JP | 2002-287149 | 10/2002 | | |
| JP | 2004-038202 | 2/2004 | | |
| WO | WO-03/001285 | * | 1/2003 | 349/5 |
| WO | WO 03/001285 | | 1/2003 | |
| WO | WO03001285 | * | 1/2003 | |
| WO | WO 03001285 A | * | 1/2003 | |

OTHER PUBLICATIONS

Weiss et al., "Electrical and thermal modulation of silicon photonic bandgap microcavities containing liquid crystals." Optics Express vol. 13 No. 4, pp. 1090-1097, 2005.*
Jones et al., Novel Configuration of the Zenithal Bistable Nematic Liquid Crystal Device, SID 98 Digest, pp. 958-961.*

(Continued)

*Primary Examiner* — Jessica M Merlin
(74) *Attorney, Agent, or Firm* — Dentons US LLP

(57) ABSTRACT

A reflection type liquid crystal display device comprises a glass substrate provided with a transparent electrode, and an Si driving circuit substrate provided with a light reflecting electrode, the glass substrate and the Si driving circuit substrate being disposed opposite to each other so that the transparent electrode and the light reflecting electrode are opposed to each other, with a liquid crystal layer composed of vertically aligned liquid crystals being interposed therebetween, wherein at least the condition of $d \cdot \Delta n \cdot |\Delta \epsilon|^2 \geq 5$ is satisfied, where d (µm) is the thickness of the liquid crystal layer, $\Delta n$ is the refractive index anisotropy of the vertically aligned liquid crystals, and $|\Delta \epsilon|$ is the magnitude of the dielectric constant anisotropy of the vertically aligned liquid crystals.

23 Claims, 4 Drawing Sheets

OTHER PUBLICATIONS

Decision to Refuse dated Feb. 17, 2012 for EP Application No. 05 004 578.0-2205.
Wu, Shin-Tson, "Reflective Liquid Crystal Displays", 2001, John Wiley & Sons Ltd., Chichester, UK.

* cited by examiner

FIG. 3

| VERTICALLY ALIGNED LIQUID CRYSTAL | CELL THICKNESS (μm) | $\Delta n$ | $|\Delta \varepsilon|$ | $d \cdot \Delta n \cdot |\Delta \varepsilon|^2$ | SATURATION VOLTAGE (V) |
|---|---|---|---|---|---|
| EXAMPLE 1 | 2.4 | 0.111 | 7.0 | 13.1 | 2.8 |
| EXAMPLE 2 | 1.9 | ← | ← | 10.3 | 3.4 |
| EXAMPLE 3 | 1.9 | 0.140 | 6.3 | 10.6 | 2.8 |
| EXAMPLE 4 | 1.7 | ← | ← | 9.45 | 3.4 |
| EXAMPLE 5 | 1.5 | ← | ← | 8.33 | 3.9 |
| EXAMPLE 6 | 1.9 | 0.115 | 7.0 | 10.7 | 3.1 |
| EXAMPLE 7 | 2.5 | 0.103 | 5.0 | 6.44 | 3.9 |
| EXAMPLE 8 | 1.9 | 0.150 | 5.0 | 7.13 | 3.6 |
| EXAMPLE 9 | 1.9 | 0.115 | 5.3 | 6.14 | 3.7 |
| EXAMPLE 10 | 1.9 | 0.118 | 6.4 | 9.18 | 3.3 |
| EXAMPLE 11 | 1.9 | 0.104 | 6.4 | 8.09 | 3.8 |
| COMPARATIVE EXAMPLE A | 2.5 | 0.082 | 4.1 | 3.45 | 6.5 |
| COMPARATIVE EXAMPLE B | 1.9 | ← | ← | 2.62 | 10 |
| COMPARATIVE EXAMPLE C | 1.9 | 0.103 | 5.0 | 4.89 | 4.4 |
| COMPARATIVE EXAMPLE D | 1.9 | 0.103 | 4.0 | 3.13 | 6.5 |

REFLECTION TYPE LIQUID CRYSTAL DISPLAY DEVICE, DISPLAY APPARATUS, AND PROJECTION SYSTEM

RELATED APPLICATION DATA

The present application claims priority to Japanese Application(s) No(s). P2004-061855 filed Mar. 5, 2005, which application(s) is/are incorporated herein by reference to the extent permitted by law.

BACKGROUND OF THE INVENTION

The present invention relates to a reflection type liquid crystal display device in which a light-transmitting electrode and a light-reflecting electrode are disposed opposite to each other with a vertically aligned liquid crystal interposed therebetween, a display apparatus using the reflection type liquid crystal display device, and a projection system using the reflection type liquid crystal display device.

In reflection type liquid crystal display devices according to the related art, the thickness of a vertically aligned liquid crystal layer is 3 to 4 µm, and the curve of the liquid crystal transmittance against the drive voltage (hereinafter referred to as V-T curve) has such a characteristic as to rise at a threshold voltage of about 2 V and to reach a maximum at an impressed voltage of 4 to 6 V. This voltage is called saturation voltage. The liquid crystal display devices are driven by inverting the positive/negative voltage on the basis of each frame or field, and, in practice, the devices are driven at a voltage of ±4 to 6 V at maximum.

Where the liquid crystal display devices are used in a three panel type projection system composed of R (RED), G (GREEN) and B (BLUE) three color panels, the saturation voltage differs according to the wavelengths of the colors. This is because it is necessary for an optical path difference called retardation to be one half of the wavelength, for maximizing the transmittance of the liquid crystal (the reflectance in the case of a reflection type liquid crystal cell). The retardation is a quantity expressed by the product of the magnitude of effective refractive index anisotropy and the cell thickness, and the effective refractive index anisotropy increases as the voltage is impressed. As the wavelength is shorter, it suffices for the effective refractive index anisotropy to be smaller, and, hence, for the impressed voltage to be lower. Specifically, the saturation voltage is the lowest for the BLUE wavelength of 450 nm, and is the second lowest for the GREEN wavelength region (550 nm).

In a white lamp used for other systems than projection system, the saturation voltage of the liquid crystal display device is at substantially the same as that for GREEN. However, since the RED wavelength is 650 nm, the saturation voltage is the highest, and, generally, the saturation voltage of the liquid crystal devices in a projection system is higher than the saturation voltage in the case of the while lamp by about 30% to 50%. Therefore, even if the white lamp can be driven at a voltage of ±5 to 6 V, it is highly possible that the saturation voltage for RED in a three panel type projection system might exceed 6 V.

Even under this condition, ordinary Si (silicon) transistors can be driven only at a voltage of 4 to 6 V, so that in the case of a RED liquid crystal display device (panel) it is impossible to display the maximum reflectance intrinsically possessed by the panel. In the three panel type projection, the RGB luminances (brightnesses) must be matched, so that the GREEN and BLUE panels which are intrinsically capable of displaying the maximum reflectance may possibly be used by lowering the luminance thereof.

On the other hand, not only in the case of the reflection type but also in the case of the transmission type, general liquid crystal display devices are asymmetric in electrode structure and shape between two opposed substrates, so that a perfect electrical symmetric relationship is not achieved. When a voltage is impressed on the device for a long time under this condition, the so-called sticking phenomenon occurs in which ions contained in the liquid crystal layer are moved and attached to the electrode on one side. In the liquid crystal display devices of the same kind, the sticking is more liable to occur as the drive voltage is higher; generally, the degree of the sticking is considered to be proportional to the square of the drive voltage. Namely, a lowering in the saturation voltage leads to suppression of the generation of the sticking. From this point of view, a reflection type liquid crystal display device capable of obtaining a high contrast even when driven at a low voltage is disclosed in Japanese Patent Laid-open No. 2003-107482.

However, in a display device using a vertically aligned liquid crystal according to the related art, as the thickness of the liquid crystal layer is reduced, a higher response speed and a higher contrast can be contrived, but the saturation voltage is raised, with the result of an adverse effect on the lowering of the drive voltage. Besides, when a liquid crystal with a high refractive index anisotropy is used while the thickness of the liquid crystal layer is maintained at 3 to 4 µm, the saturation voltage can be lowered, but it is difficult to enhance the response speed, it is impossible to obtain a high contrast and, hence, there arises a limitation in enhancing the performance.

SUMMARY OF THE INVENTION

Accordingly, it is an object of the present invention to solve the above-mentioned problems, i.e. to contrive a higher response speed and a higher contrast through reducing the thickness of a liquid crystal film and to contrive a lower drive voltage through reducing the saturation voltage.

In order to attain the above objects, according to aspects of the present invention, there are provided a reflection type liquid crystal display device, a display apparatus, and a projection system in which a first substrate provided with a light-transmitting electrode (a transparent electrode) and a second substrate provided with a light-reflecting electrode are disposed opposite to each other so that the light-transmitting electrode and the light-reflecting electrode are opposed to each other, with a liquid crystal layer composed of vertically aligned liquid crystals being interposed therebetween, wherein the conditions of $d \cdot \Delta n \cdot |\Delta \epsilon|^2 \geq 5$, $d \leq 2.5$, and $|\Delta \epsilon| \leq 5.5$ are satisfied, where d (µm) is the thickness of the liquid crystal layer, $\Delta n$ is the refractive index anisotropy of the vertically aligned liquid crystals, and $|\Delta \epsilon|$ is the dielectric constant anisotropy of the vertically aligned liquid crystals.

According to the present invention as above, the conditions of $d \cdot \Delta n \cdot |\Delta \epsilon|^2 \geq 5$, $d \leq 2.5$, and $|\Delta \epsilon| \geq 5.5$ are satisfied, where d (µm) is the thickness of the liquid crystal layer, $\Delta n$ is the refractive index anisotropy of the vertically aligned liquid crystals, and $|\Delta \epsilon|$ is the dielectric constant anisotropy of the vertically aligned liquid crystals, whereby it is possible to suppress the rise in the saturation voltage due to the thinning of the liquid crystal layer.

In addition, the display apparatus and the projection system according to the present invention each comprise a reflection type liquid crystal display device satisfying the conditions of $d \cdot \Delta n \cdot |\Delta \epsilon|^2 \geq 5$, and $d \leq 2.5$, and a driving circuit for impressing a predetermined voltage on the reflection type liquid crystal display device, wherein a maximum drive voltage impressed on the reflection type liquid crystal display device by the driving circuit is set in correspondence with the wavelength of light incident on the reflection type liquid crystal display device, or, alternatively, the driving circuit is so configured as to be able to vary the maximum drive voltage impressed on the reflection type liquid crystal display device.

According to the present invention, therefore, it is possible to enhance response speed and contrast through thinning of the liquid crystal layer, and to achieve driving at a low voltage of not more than 4 V in the cases of GREEN (550 nm), BLUE (450 nm) and a white lamp, and at a low voltage of 5 to 6 V even in the case of RED (650 nm) for which the saturation voltage is the highest in the three panel type projection. In short, according to the invention it is possible to suppress the rise in the saturation voltage and to realize the low voltage driving together with a high speed response performance and a high contrast even with a thin type liquid crystal display device, and to contrive a reduction in power consumption and the prevention of sticking.

BRIEF DESCRIPTION OF THE DRAWINGS

The above and other objects, features and advantages of the present invention will become apparent from the following description and appended claims, taken in conjunction with the accompanying drawings, in which:

FIG. 3 is a table showing Examples of the present invention and Comparative Examples;

DETAILED DESCRIPTION OF THE PREFERRED EMBODIMENTS

Figure 1:
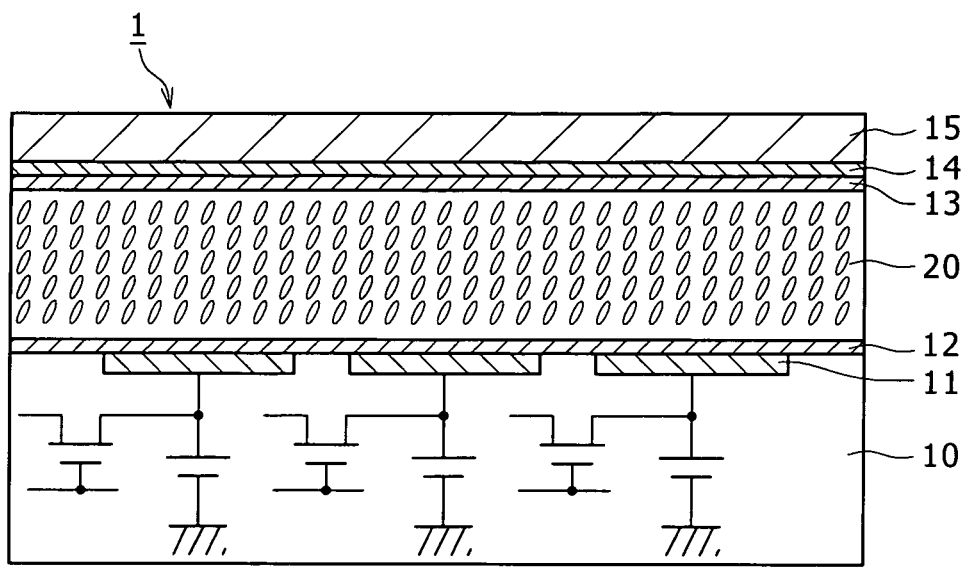
FIG. 1 is a schematic sectional view for illustrating the configuration of a liquid crystal display device applicable in the present embodiment.

Now, embodiments of the present invention will be described below, based on the drawings. FIG. 1 is a schematic sectional view illustrating the configuration of a liquid crystal display device 1 applicable in the present embodiment. The liquid crystal display device, as a reflection type liquid crystal display device, comprises a Si (silicon) or other single crystal semiconductor substrate (Si driving circuit substrate 10) provided with light-reflecting electrodes 11 having a pixel structure, and a glass substrate 15 provided with a transparent electrode 14 and opposed thereto, and the two substrates are disposed opposite to each other, with vertically aligned liquid crystals 20 sealed therebetween.

In the reflection type liquid crystal display device 1, the Si driving circuit substrate 10 has a structure in which driving circuits each composed of a transistor (a CMOS or an n channel MOS) and a capacitor are formed on a single crystal silicon substrate, and light-reflecting electrodes 11 composed of Al (aluminum), Ag (silver) or the like metallic film are formed thereon. The light-reflecting electrode 11 combines a light-reflecting film with an electrode for the voltage impressed on a liquid crystal. On the light-reflecting electrodes 11, a dielectric multi-layer film may be formed for enhancing reflectance or as a protective film for the metallic surface. In addition, a liquid crystal alignment film 12 is formed between the light-reflecting electrodes 11 and the vertically aligned liquid crystals 20, and a liquid crystal alignment film 13 is formed between the transparent electrode 14 of the glass substrate 15 and the vertically aligned liquid crystals 20.

Here, as described in Japanese Patent Laid-open No. 2003-107482, in a vertically aligned liquid crystal cell having a cell thickness of not more than 2.0 μm, the drive voltage can be made to be 5 to 6 V by controlling the refractive index anisotropy $\Delta n$ to a value of not less than 0.1. However, for further lowering the drive voltage, specifically to or below 4 V, the adjustment by controlling only $\Delta n$ leads to a limitation in selecting the materials.

On the other hand, the present inventors have found out that the magnitude of dielectric constant anisotropy $|\Delta \varepsilon|$ also has relationship with the drive voltage, and a detailed investigation has revealed that the thickness d (μm) of the liquid crystal layer, the refractive index anisotropy $\Delta n$, and the magnitude of the dielectric constant anisotropy $|\Delta \varepsilon|$ have relationship with the drive voltage (saturation voltage). It has been found, therefore, that the drive voltage can be made to be not more than 4 V under the condition where the correlation expression of these factors satisfies the condition of $d \cdot \Delta n \cdot |\Delta \varepsilon|^2 \cong 5$.

Incidentally, in consideration of the fact that a liquid crystal material which can be served as a vertically aligned liquid crystal device has a $\Delta n$ of 0.07 to 0.2 and a $|\Delta \varepsilon|$ of 4 to 10, the above condition is satisfied irrespectively of the kind of the liquid crystal material, inasmuch as the thickness d of the liquid crystal layer is not less than 5 μm, which is contrary to the gist of the present invention. Besides, although the drive voltage can be lowered by using a crystal having a high $\Delta n$ when d is 3 to 4 μm, such an approach is poor in practicality from the viewpoint of response speed, as seen from the following formula. Namely, the response time is proportional to the square of the thickness of the crystal layer and is inversely proportional to the square of the drive voltage.

$$\text{Rise time: } \tau \text{on} = \gamma d^2 / [\varepsilon(0) \cdot \Delta \varepsilon \cdot (V^2 - Vc^2)]$$

$$\text{Fall time: } \tau \text{off} = \gamma \cdot d^2 / K \cdot \pi^2$$

Where $\gamma$ is the viscosity of the liquid crystal, $\varepsilon(0)$ is dielectric constant in vacuum, V is the voltage impressed on the liquid crystal, Vc is the threshold voltage, and K is the elastic constant of the liquid crystal.

Therefore, for lowering the drive voltage while maintaining the practicality of the liquid crystal device, it is necessary to simultaneously reduce the thickness of the liquid crystal layer.

The present embodiment shows that, in a liquid crystal device having a liquid crystal layer thickness of not more than 2.5 μm, which is thinner than a related-art device, the conditions for satisfying $d \cdot \Delta n \cdot |\Delta \varepsilon|^2 \geqq 5$ provide a method for achieving a lowering in the drive voltage.

Figure 2:
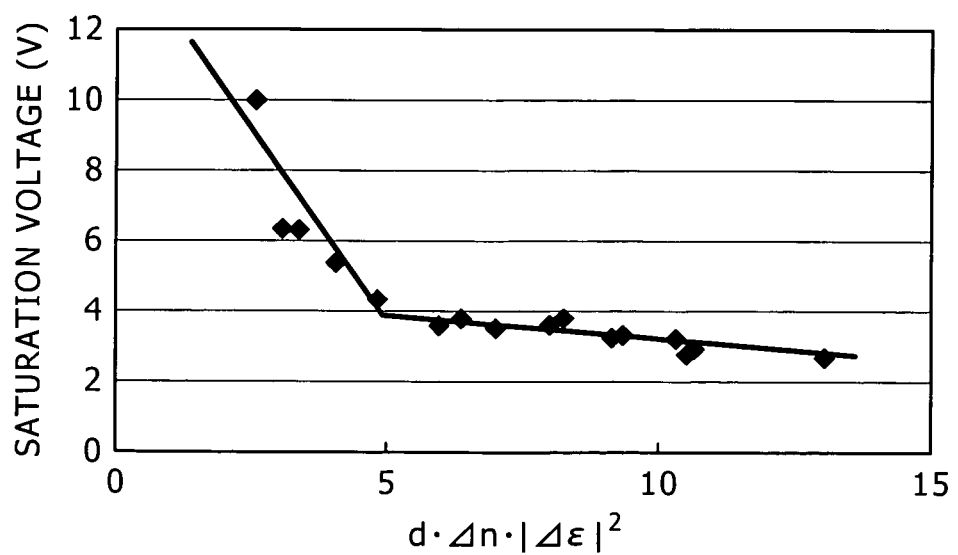
FIG. 2 is a diagram showing the relationship of saturation voltage with $d \cdot \Delta n \cdot |\Delta \varepsilon|^2$.

FIG. 2 is a diagram showing the relationship of the saturation voltage with the relational expression $d \cdot \Delta n \cdot |\Delta \varepsilon|^2$. Incidentally, the relationship shown in this figure has been obtained assuming that the wavelength of light is 550 nm. As seen from this figure, the saturation voltage is not more than 4 V if $d \cdot \Delta n \cdot |\Delta \varepsilon|^2 \geqq 5$.

In the following, Examples of the present invention which satisfy the above relationship are described together with Comparative Examples. FIG. 3 is a table for showing Examples of the present invention and Comparative Examples. Now, Comparative Examples and Examples will be sequentially described below.

Comparative Example A

A vertically aligned liquid crystal display device was produced in the following manner. A glass substrate provided with a transparent electrode and an Si driving circuit substrate provided with Al electrodes were cleaned, were then introduced into a vapor deposition apparatus, and an $SiO_2$ film as a liquid crystal alignment film was formed thereon by skew vapor deposition at a vapor deposition angle in the range of 45° to 60°. The film thickness of the liquid crystal alignment film was controlled to 50 nm, and the pretilt angle of the liquid crystal was controlled to about 2.5°. Thereafter, both the substrates after the formation of the liquid crystal alignment film were adhered to each other with an interval of 2.5 μm therebetween by use of a seal member mixed with glass beads, and vertically aligned liquid crystals as follows were sealed therebetween, to produce a reflection type liquid crystal display device. The liquid crystal used had $\Delta n=0.082$, $|\Delta\varepsilon|=4.1$, $d\cdot\Delta n\cdot|\Delta\varepsilon|^2=3.45$, and a saturation voltage (measured at 550 nm)=6.5 V.

Comparative Example B

A vertically aligned liquid crystal display device was produced in the following manner. A glass substrate provided with a transparent electrode and an Si driving circuit substrate provided with Al electrodes were cleaned, were then introduced into a vapor deposition apparatus, and an $SiO_2$ film as a liquid crystal alignment film was formed thereon by skew vapor deposition at a vapor deposition angle in the range of 45° to 60°. The film thickness of the liquid crystal alignment film was controlled to 50 nm, and the pretilt angle of the liquid crystal was controlled to about 2.5°. Thereafter, both the substrates after the formation of the liquid crystal alignment film were adhered to each other with an interval of 1.9 μm therebetween by use of a seal member mixed with glass beads, and the vertically aligned liquid crystals described in Comparative Example A were sealed therebetween, to produce a reflection type liquid crystal display device. The liquid crystal used had $d\cdot\Delta n\cdot|\Delta\varepsilon|^2=2.62$, and a saturation voltage (measured at 550 nm)=10 V.

Comparative Example C

A vertically aligned liquid crystal display device was produced in the following manner. A glass substrate provided with a transparent electrode and an Si driving circuit substrate provided with Al electrodes were cleaned, were then introduced into a vapor deposition apparatus, and an $SiO_2$ film as a liquid crystal alignment film was formed thereon by skew vapor deposition at a vapor deposition angle in the range of 45° to 60°. The film thickness of the liquid crystal alignment film was controlled to 50 nm, and the pretilt angle of the liquid crystal was controlled to about 2.5°. Thereafter, both the substrates after the formation of the liquid crystal alignment film were adhered to each other with an interval of 1.9 μm therebetween by use of a seal member mixed with glass beads, and vertically aligned liquid crystals as follows were sealed therebetween, to produce a reflection type liquid crystal display device. The liquid crystal used had $\Delta n=0.103$, $|\Delta\varepsilon|=5.0$, $d\cdot\Delta n\cdot|\Delta\varepsilon|^2=4.89$, and a saturation voltage (measured at 550 nm)=4.4 V.

Comparative Example D

A vertically aligned liquid crystal display device was produced in the following manner. A glass substrate provided with a transparent electrode and an Si driving circuit substrate provided with Al electrodes were cleaned, were then introduced into a vapor deposition apparatus, and an $SiO_2$ film as a liquid crystal alignment film was formed thereon by skew vapor deposition at a vapor deposition angle in the range of 45° to 60°. The film thickness of the liquid crystal alignment film was controlled to 50 nm, and the pretilt angle of the liquid crystal was controlled to about 2.5°. Thereafter, both the substrates after the formation of the liquid crystal alignment film were adhered to each other with an interval of 1.9 μm therebetween by use of a seal member mixed with glass beads, and vertically aligned liquid crystals as follows were sealed therebetween, to produce a reflection type liquid crystal display device. The liquid crystal used had $\Delta n=0.103$, $|\Delta\varepsilon|=4.0$, $d\cdot\Delta n\cdot|\Delta\varepsilon|^2=3.13$, and a saturation voltage (measured at 550 nm)=6.5 V.

Example 1

In the same manner as in Comparative Examples above, a vertically aligned liquid crystal display device was produced in the following manner. A glass substrate provided with a transparent electrode and an Si driving circuit substrate provided with Al electrodes were cleaned, were then introduced into a vapor deposition apparatus, and an $SiO_2$ film as a liquid crystal alignment film was formed thereon by skew vapor deposition at a vapor deposition angle in the range of 45° to 60°. The film thickness of the liquid crystal alignment film was controlled to 50 nm, and the pretilt angle of the liquid crystal was controlled to about 2.5°. Thereafter, both the substrates after the formation of the liquid crystal alignment film were adhered to each other with an interval of 2.4 μm therebetween by use of a seal member mixed with glass beads, and vertically aligned liquid crystals as follows were sealed therebetween, to produce a reflection type liquid crystal display device. The liquid crystal used had $\Delta n=0.111$, $|\Delta\varepsilon|=7.0$, $d\cdot\Delta n\cdot|\Delta\varepsilon|^2=13.1$, and a saturation voltage (measured at 550 nm)=2.8 V.

Example 2

In the same manner as in Comparative Examples and Example above, a vertically aligned liquid crystal display device was produced in the following manner. A glass substrate provided with a transparent electrode and an Si driving circuit substrate provided with Al electrodes were cleaned, were then introduced into a vapor deposition apparatus, and an $SiO_2$ film as a liquid crystal alignment film was formed thereon by skew vapor deposition at a vapor deposition angle in the range of 45° to 60°. The film thickness of the liquid crystal alignment film was controlled to 50 nm, and the pretilt angle of the liquid crystal was controlled to about 2.5°. Thereafter, both the substrates after the formation of the liquid crystal alignment film were adhered to each other with an interval of 1.9 μm therebetween by use of a seal member mixed with glass beads, and the vertically aligned liquid crystals used in Example 1 were sealed therebetween, to produce a reflection type liquid crystal display device. As a result, $d\cdot\Delta n\cdot\Delta\varepsilon|^2=10.3$, and a saturation voltage (measured at 550 nm)=3.4 V.

Example 3

In the same manner as in Comparative Examples and Examples above, a vertically aligned liquid crystal display device was produced in the following manner. A glass substrate provided with a transparent electrode and an Si driving circuit substrate provided with Al electrodes were cleaned, were then introduced into a vapor deposition apparatus, and an SiO₂ film as a liquid crystal alignment film was formed thereon by skew vapor deposition at a vapor deposition angle in the range of 45° to 60°. The film thickness of the liquid crystal alignment film was controlled to 50 nm, and the pretilt angle of the liquid crystal was controlled to about 2.5°. Thereafter, both the substrates after the formation of the liquid crystal alignment film were adhered to each other with an interval of 1.9 μm therebetween by use of a seal member mixed with glass beads, and vertically aligned liquid crystals as shown in the following table were sealed therebetween, to produce a reflection type liquid crystal display device. The liquid crystal used had $\Delta n=0.140$, $|\Delta\in|=6.3$, $d\cdot\Delta n\cdot|\Delta\in|^2=10.6$, and a saturation voltage (measured at 550 nm)=2.8 V.

Example 4

In the same manner as in Comparative Examples and Examples above, a vertically aligned liquid crystal display device was produced in the following manner. A glass substrate provided with a transparent electrode and an Si driving circuit substrate provided with Al electrodes were cleaned, were then introduced into a vapor deposition apparatus, and an SiO₂ film as a liquid crystal alignment film was formed thereon by skew vapor deposition at a vapor deposition angle in the range of 45° to 60°. The film thickness of the liquid crystal alignment film was controlled to 50 nm, and the pretilt angle of the liquid crystal was controlled to about 2.5°. Thereafter, both the substrates after the formation of the liquid crystal alignment film were adhered to each other with an interval of 1.7 μm therebetween by use of a seal member mixed with glass beads, and the vertically aligned liquid crystals used in Example 3 were sealed therebetween, to produce a reflection type liquid crystal display device. As a result, $d\cdot\Delta n\cdot|\Delta\in|^2=9.45$, and a saturation voltage (measured at 550 nm)=3.4 V.

Example 5

In the same manner as in Comparative Examples and Examples above, a vertically aligned liquid crystal display device was produced in the following manner. A glass substrate provided with a transparent electrode and an Si driving circuit substrate provided with Al electrodes were cleaned, were then introduced into a vapor deposition apparatus, and an SiO₂ film as a liquid crystal alignment film was formed thereon by skew vapor deposition at a vapor deposition angle in the range of 45° to 60°. The film thickness of the liquid crystal alignment film was controlled to 50 nm, and the pretilt angle of the liquid crystal was controlled to about 2.5°. Thereafter, both the substrates after the formation of the liquid crystal alignment film were adhered to each other with an interval of 1.5 μm therebetween by use of a seal member mixed with glass beads, and the vertically aligned liquid crystals used in Examples 3 and 4 were sealed therebetween, to produce a reflection type liquid crystal display device. As a result, $d\cdot\Delta n\cdot|\Delta\in|^2=8.33$, and a saturation voltage (measured at 550 nm)=3.9 V.

Examples 6 To 11

In the same manner as in Comparative Examples and Examples above, a vertically aligned liquid crystal display device was produced in the following manner. A glass substrate provided with a transparent electrode and an Si driving circuit substrate provided with Al electrodes were cleaned, were then introduced into a vapor deposition apparatus, and an SiO₂ film as a liquid crystal alignment film was formed thereon by skew vapor deposition at a vapor deposition angle in the range of 45° to 60°. The film thickness of the liquid crystal alignment film was controlled to 50 nm, and the pretilt angle of the liquid crystal was controlled to about 2.5°. Thereafter, both the substrates after the formation of the liquid crystal alignment film were adhered to each other with an interval of 1.9 or 2.5 μm therebetween by use of a seal member mixed with glass beads, and vertically aligned liquid crystals shown in the following table were sealed therebetween, to produce a reflection type liquid crystal display device. As a result, $d\cdot\Delta n\cdot|\Delta\in|^2=6.14$ to 10.7, and a saturation voltage (measured at 550 nm)=3.1 to 3.9 V.

Incidentally, where $|\Delta n|$ is not less than 0.15, for example, is 0.16 or 0.17 or the like, the same effect as above is obtained. Besides, where $|\Delta\in|$ is not less than 7, for example, is 8 or 9 or the like, the same effect as above is obtained. Thus, the saturation voltage can be made to be not more than 4 V when $d\cdot\Delta n\cdot|\Delta\in|^2\geqq 5$.

Figure 4:
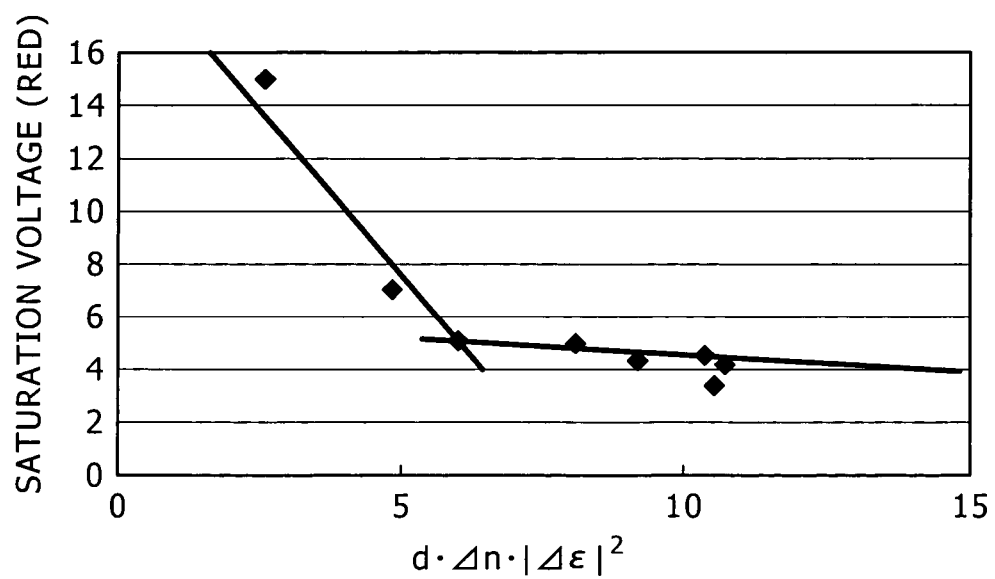
FIG. 4 is a diagram showing the relationship of saturation voltage for R (RED) with $d \cdot \Delta n \cdot |\Delta \varepsilon|^2$.

Here, of the cases of R (RED), G (GREEN), and B (BLUE), the case of R (RED) for which the saturation voltage is the highest in view of the relationship of wavelength will be described as an example. FIG. 4 is a diagram showing the relationship of the saturation voltage for R (RED) against $d\cdot\Delta n\cdot|\Delta\in|^2$. The relationship shown in this diagram has been obtained assuming a light wavelength to be 650 nm.

Specifically, the saturation voltage (RED) in Examples 2 above is 4.5 V, the saturation voltage (RED) in Example 3 is 3.3 V, the saturation voltage (RED) in Example 6 is 4.2 V, the saturation voltage (RED) in Example 9 is 5.0 V, the saturation voltage (RED) in Example 10 is 4.3 V, the saturation voltage (RED) in Example 11 is 5.0 V, the saturation voltage (RED) in Comparative Example B is 15 V, the saturation voltage (RED) in Comparative Example C is 7 V, and the saturation voltage (RED) in Comparative Example D is 12 V.

As shown from FIG. 4, for R (RED), a threshold of the saturation voltage (RED) is in the vicinity of the position where the value of $d\cdot\Delta n\cdot|\Delta\in|^2$ is 6. In addition, under the conditions of a more practical cell thickness of d=2.0 μm and $\Delta n=0.1$, a $|\Delta\in|$ value of not less than 5.5 is necessary for satisfying $d\cdot\Delta n\cdot|\Delta\in|^2\geqq 6$.

Here, the correlational expression of $d\cdot\Delta n\cdot|\Delta\in|^2$ will be described more. The optical path difference at the time when the reflectance in the reflection type liquid crystal display device reached a maximum is one half (½) of the wavelength at that time. Since, in the reflection type liquid crystal display device, d can be deemed as doubled in view of the forward going and the returning, $d\cdot\Delta n(\text{eff})$ is $\lambda/4$.

$\Delta n(\text{eff})$ is the effective value of $\Delta n$, i.e., the actual refractive index anisotropy. $\Delta n$ is a physical value intrinsic of a liquid crystal material, and the refractive index anisotropy $\Delta n(\text{eff})$ in use in an actual vertically aligned liquid crystal device is represented as follows.

$$\Delta n(\text{eff}) = n(//)\cdot n(\perp) \bigg/ \sqrt{\left(\frac{n(//)^2\cdot\cos^2(\theta)+}{n(\perp)^2\cdot\sin^2(\theta)}\right)} - n(\perp)$$

where $n(//)$ is the refractive index in the major axis direction of the liquid crystal, $n(\perp)$ is the refractive index in the minor axis direction of the liquid crystal, and $\theta$ is the tilt angle of liquid crystal molecules.

A high light output can be obtained by setting the tilt angle θ of the liquid crystal molecules used, i.e., the voltage for driving the reflection type liquid crystal device, so as to satisfy the condition for the reflectance in the reflection type liquid crystal device (ratio of outgoing light as opposed to incident light) to reach a maximum.

Besides, since θ is the angle to which the liquid crystals are tilted upon application of a voltage, the value of θ can intrinsically range from 0° to 90°. However, in consideration of the fact that θ in an actual device is about 60° at maximum, even in the case of a liquid crystal material having, for example, a Δn value of 0.1, Δn(eff) in the actual device is no more than about 0.08 (80% of Δn) at maximum.

In view of the above, summarizing the above relationships, d·Δn(eff)=λ/4, that is, d·0.8Δn=λ/4, d·Δn=λ/3.2. Therefore, since λ=0.55 μm for GREEN, for d·Δn·|Δ∈|² to be not less than 5, it is necessary for |Δ∈| to be not less than 5.4 (preferably, not less than 5.5). Accordingly, by satisfying |Δ∈|≧5.5, the tilt angle of the liquid crystal is substantially maximized in use under the condition of driving at a saturation voltage of not more than 4 V, whereby the gradation property of images against impressed voltage (the controllability of the tilt angle of the liquid crystal molecules) can be enhanced.

Figure 5:
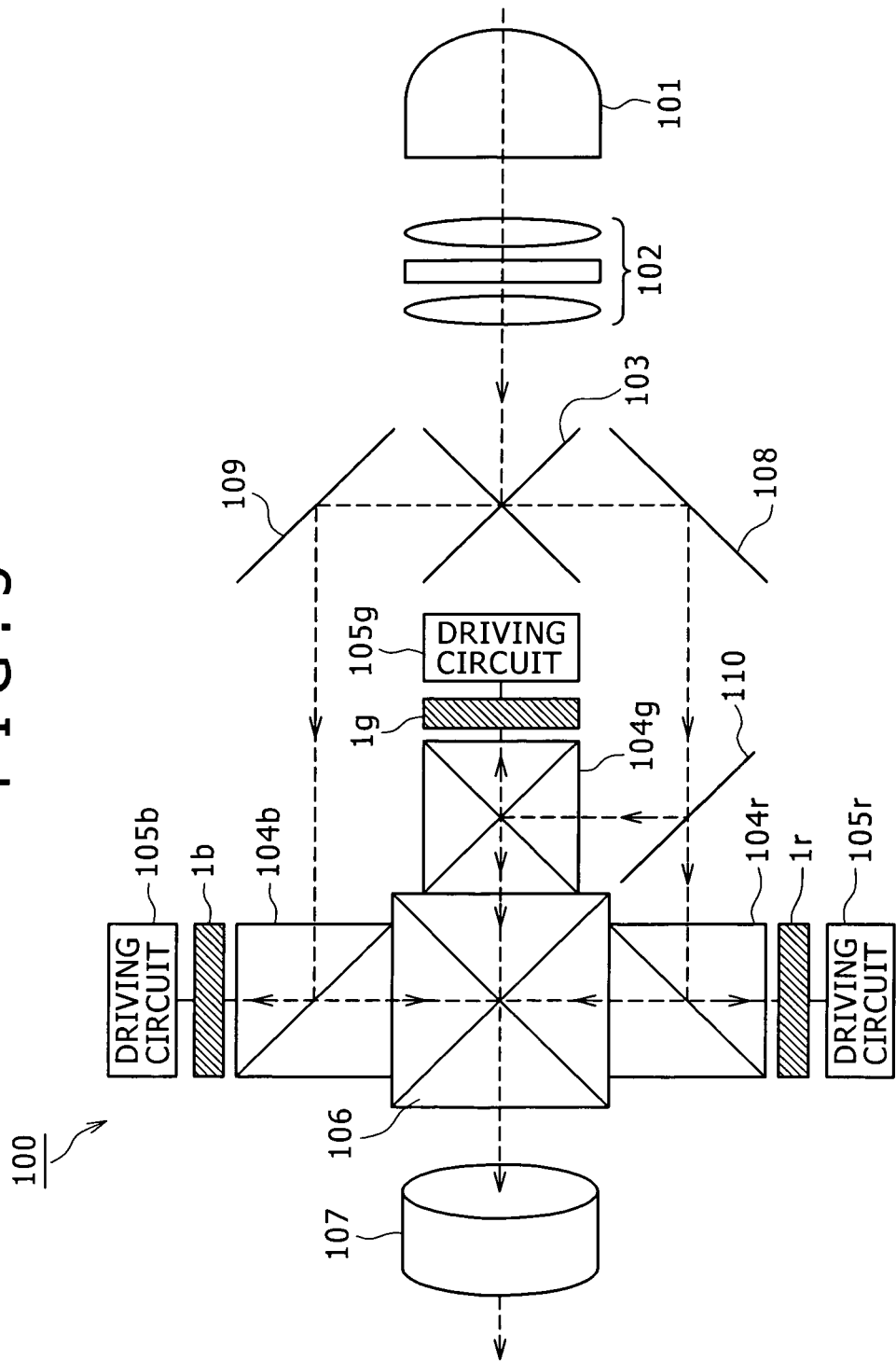
FIG. 5 is a schematic view showing an example in which reflection type liquid crystal display devices are applied to a projection system.

FIG. 5 is a schematic diagram showing an example of application of a reflection type liquid crystal display device according to the present embodiment to a projection system. In the diagram, the projection system 100 comprises a lamp light source 101, a lens unit 102, dichroic color separation filters 103, a dichroic mirror 110, total reflection mirror 108, 109, beam splitters 104r, 104g, 104b, reflection type liquid crystal display devices 1r, 1g, 1b, driving circuits 105r, 105g, 105b, a prism 106, and a projection lens 107.

The lamp light source 101 outputs light containing three color components of R (RED), G (GREEN), and B (BLUE), and is composed, for example, a metal halide lamp, an extra-high pressure mercury lamp or the like. The lens unit 102 condenses the light outputted from the lamp light source 101 so that the reflection type liquid crystal display devices 1r, 1g, 1b are illuminated appropriately. The lens unit 102 may be configured together with a pair of fly eye lenses, for evening the output of light from the lamp light source 101. The dichroic color separation filter 103 and the dichroic mirror 110 separate the inputted light into predetermined color rays. The beam splitters 104r, 104g, 104b are devices for separating the polarized light components of the light by transmitting predetermined polarized light (for example, P polarized light) while reflecting light (for example, S polarized light orthogonal to the P polarized light) in the different polarization direction from that of the predetermined polarized light. The prism 106 is a device for composing the color rays incident from three directions and emitting the composed light, and is composed, for example, of a so-called cross-dichroic prism in which dichroic filters are disposed in an intersected manner.

In this system, the light emitted from the lamp light source 101 is sent through the lens unit 102 to the dichroic color separation filter 103, where the light is separated into two directions as different color rays. The color rays thus separated into two directions are sent to display units composed of the reflection type liquid crystal display devices 1r, 1g, 1b corresponding to the three colors of R (RED), G (GREEN), and B (BLUE), by the total reflection mirrors 108, 109, the beam splitters 104r, 104g, 104b, the dichroic mirror 110, and the prism 106.

For example, the light from the lamp light source 101 is color-separated by the dichroic color separation filter 103, the color rays containing R (RED) and G (GREEN) component rays are reflected by the total reflection filter 108 to be supplied to the dichroic mirror 110, and R (RED) component ray obtained by color separation in the dichroic mirror 110 and transmitted is incident on the reflection type liquid crystal display device 1r corresponding to R (RED), through the beam splitter 104r. On the other hand, the light from the lamp light source 101 is color-separated by the dichroic color separation filter 103, the color rays containing R (RED) and G (GREEN) component rays are reflected by the total reflection mirror 108 to be supplied to the dichroic mirror 110, and the G (GREEN) component ray color-separated by the dichroic mirror 110 and reflected is incident on the reflection type liquid crystal display device 1g corresponding to G (GREEN), through the beam splitter 104g. The light from the lamp light source 101 is color-separated by the dichroic color separation filter 103, and the color ray containing B (BLUE) component ray is reflected by the total reflection mirror is incident on the reflection type liquid crystal display device 1b corresponding to B (BLUE), through the beam splitter 104b.

The reflection type liquid crystal display devices 1r, 1g, 1b are driven respectively by the corresponding driving circuits 105r, 105g, 105b. Specifically, based on image signals corresponding respectively to the colors, a voltage is impressed on each pixel, the polarization planes of the polarized rays incident through the beam splitters 104r, 104g, 104b are optically rotated by the liquid crystal layer, and the rotatorily polarized light is reflected by the light reflecting electrode 11, before outgoing. The beam splitters 104r, 104g, 104b outputs predetermined polarized light components of the outgoing light to the prism 106 as image rays. The color image rays thus outputted are composed by the prism 106, and the composed light is sent to the projection lens 107. As a result, an image corresponding to the three colors of R (RED), G (GREEN), and B (BLUE) is projected on a screen (not shown), to be reproduced as a color image.

In the projection system 100 in the present embodiment, the above-described reflection type liquid crystal display devices 1r, 1g, 1b are used in correspondence with the R (RED), G (GREEN), and B (BLUE) colors, so that the devices can be driven at a high response speed, a high contrast, and a low voltage. On the other hand, since the reflection type liquid crystal display devices 1r, 1g, 1b for R (RED), G (GREEN), and B (BLUE) differ in saturation voltage, the present embodiment is characterized in that the driving circuits 105r, 105g, 105b for driving the reflection type liquid crystal display devices 1r, 1g, 1b are different in maximum drive voltage.

As has been described above, in the reflection type liquid crystal display devices 1r, 1g, 1b in the present embodiment, the saturation voltage differs depending on the wavelength. For example, since the wavelength of G (GREEN) is 550 nm and the wavelength of B (BLUE) is 450 nm, the saturation voltage therefor is not more than 4 V, and since the wavelength of R (RED) is 650 nm, the saturation voltage therefor is 5 to 6 V. Therefore, depending on the difference in saturation voltage, the maximum drive voltages given from the driving circuits 105r, 105g, 105b are varied on the basis of each of the reflection type liquid crystal display devices 1r, 1g, 1b. In addition, each of the driving circuits 105r, 105g, 105b is so configured that the maximum drive voltage can be variably set so as to make it possible to correspond to the saturation voltage for each color. By this, it is possible to optimally control the reflection type liquid crystal display devices 1r, 1g, 1b according to the individual colors. It is natural that the optimum maximum drive voltages can be set fixedly.

The reflection type liquid crystal display device according to the present invention is applicable not only to the above-described projection system but also to various display apparatuses such as a display of an electronic apparatus for displaying an image directly, without projection onto a screen.

The present invention is not limited to the details of the above described preferred embodiments. The scope of the invention is defined by the appended claims and all changes and modifications as fall within the equivalents of the scope of the claims are therefore to be embraced by the invention.

What is claimed is:

1. A reflection type liquid crystal display device comprising:
    a first substrate provided with a light-transmitting electrode;
    a second substrate provided with a light-reflecting electrode; and
    a liquid crystal layer which can optically rotate a polarized plane of incoming polarized light,
    wherein,
        said first and second substrates are disposed in opposition to each other so that said light-transmitting electrode and said light-reflecting electrode face each other,
        said liquid crystal layer is composed of vertically aligned liquid crystal molecules interposed between said first and second substrates with each of said liquid crystal molecules controlled to a desired tilt angle corresponding to a voltage applied to said liquid crystal layer,
        the conditions of $d \cdot \Delta n \cdot |\Delta \in|^2 \geq 5$, $d \leq 2.5$, $|\Delta \in| \geq 7$, and $\Delta n > 0.1$ are satisfied such that a saturation voltage of the liquid crystal display is not more than 4.0 volts at a light wavelength of 550 nm, where d is the thickness in μm of said liquid crystal layer, $\Delta n$ is the refractive index anisotropy of said vertically aligned liquid crystal molecules, and $\Delta \in$ is the dielectric constant anisotropy of said vertically aligned liquid crystal molecules, and
        the relationship of $d \cdot \Delta n(\text{eff}) = \lambda/4$ is satisfied, where $\lambda$ is the wavelength of the light traversing the liquid crystal layer, d is the thickness in μm of said liquid crystal layer, $\Delta n(\text{eff})$ is the effective refractive index anisotropy of said vertically aligned liquid crystal molecules.

2. The reflection type liquid crystal display device as set forth in claim 1, wherein the refractive index anisotropy $\Delta n$ of said vertically aligned liquid crystal molecules is $\leq 0.150$.

3. The reflection type liquid crystal display device as set forth in claim 1 further comprising:
    an upper liquid crystal alignment film spaced from the first substrate by the transparent electrode; and
    a lower liquid crystal alignment film abutting the second substrate and the light-reflecting electrode.

4. The reflection type liquid crystal display device as set forth in claim 1, wherein an effective refractive index anisotropy of said vertically aligned liquid crystal molecules $\Delta n$(eff) is $\leq 80\%$ of the refractive index anisotropy $\Delta n$ of said vertically aligned liquid crystal.

5. A display apparatus comprising:
    a reflection type liquid crystal display device which can modulate an incoming predetermined polarized light so that a polarization plane of said predetermined polarized light is optically rotated by a liquid crystal layer,
    said reflection type liquid crystal display device having a first substrate provided with a light-transmitting electrode, and a second substrate provided with a light-reflecting electrode, said first and second substrates being disposed in opposition to each other so that said light-transmitting electrode and said light-reflecting electrode face each other, with said liquid crystal layer composed of vertically aligned liquid crystal molecules interposed between said first and second substrates with each of said liquid crystal molecules controlled to a desired tilt angle corresponding to a voltage applied to said liquid crystal layer, in which the conditions of $$d \cdot \Delta n \cdot |\Delta \in|^2 \geq 5, \ d \leq 2.5, \ |\Delta \in| \geq 7, \ \text{and} \ \Delta n > 0.1$$

are satisfied such that a saturation voltage of the liquid crystal display is not more than 4.0 volts at a light wavelength of 550 nm, where d is the thickness in μm of said liquid crystal layer, $\Delta n$ is the refractive index anisotropy of said vertically aligned liquid crystal molecules, and $\Delta \in$ is the dielectric constant anisotropy of said vertically aligned liquid crystal molecules; and
    a driving circuit to impress a predetermined voltage on said reflection type liquid crystal display device,
    wherein,
        the relationship of $d \cdot \Delta n(\text{eff}) = \lambda/4$ is satisfied, where $\lambda$ is the wavelength of the light traversing the liquid crystal layer, d is the thickness in μm of said liquid crystal layer, $\Delta n(\text{eff})$ is the effective refractive index anisotropy of said vertically aligned liquid crystal molecules, and
        said driving circuit is so set that the reflectance in reflection from said reflection type liquid crystal display device is maximized at a maximum drive voltage.

6. The display apparatus as set forth in claim 5, wherein said driving circuit is so configured that the maximum drive voltage impressed on said reflection type liquid crystal display device is set in correspondence with the wavelength of light incident on said reflection type liquid crystal display device.

7. The display apparatus as set forth in claim 5, further comprising:
    an upper liquid crystal alignment film spaced from the first substrate by the transparent electrode; and
    a lower liquid crystal alignment film abutting the second substrate and the light-reflecting electrode.

8. A projection system comprising:
    reflection type liquid crystal display devices which can modulate an incoming predetermined polarized light so that a polarization plane of said predetermined polarized light is optically rotated by a liquid crystal layer, the reflection type liquid crystal display devices having a first substrate provided with a light-transmitting electrode, and a second substrate provided with a light-reflecting electrode, said first and second substrates disposed in opposition to each other so that said light-transmitting electrode and said light-reflecting electrode face each other, with a liquid crystal layer composed of vertically aligned liquid crystal molecules interposed between said first and second substrates with each of said liquid crystal molecules controlled to a desired tilt angle corresponding to a voltage applied to said liquid crystal layer, in which the conditions of $$d \cdot \Delta n \cdot |\Delta \in|^2 \geq 5, \ d \leq 2.5, \ |\Delta \in| \geq 7, \ \text{and} \ \Delta n > 0.1$$

are satisfied such that a saturation voltage of the liquid crystal display is not more than 4.0 volts at a light wavelength of 550 nm, where d is the thickness in μm of said liquid crystal layer, $\Delta n$ is the refractive index anisotropy of said vertically aligned liquid crystal molecules, and $\Delta\in$ is the dielectric constant anisotropy of said vertically aligned liquid crystal molecules; and a display unit in which said reflection type liquid crystal display devices are disposed in respective correspondence with a plurality of color signals, and a driving circuit to supply different maximum drive voltages to said reflection type liquid crystal display devices in said display unit, wherein, the relationship of d·Δn(eff)=λ/4 is satisfied, where λ is the wavelength of the light traversing the liquid crystal layer, d is the thickness in μm of said liquid crystal layer, Δn(eff) is the effective refractive index anisotropy of said vertically aligned liquid crystal molecules, and said reflection type liquid crystal display devices are disposed in the path of light emitted from a light source.

9. The projection system as set forth in claim 8, further comprising:

an upper liquid crystal alignment film spaced from the first substrate by the transparent electrode; and a lower liquid crystal alignment film abutting the second substrate and the light-reflecting electrode.

10. A display apparatus comprising:

a reflection type liquid crystal display device which can modulate an incoming predetermined polarized light so that a polarization plane of said predetermined polarized light is optically rotated by a liquid crystal layer, the reflection type liquid crystal display device having a first substrate provided with a light-transmitting electrode, and a second substrate provided with a light-reflecting electrode, said first and second substrates disposed in opposition to each other so that said light-transmitting electrode and said light-reflecting electrode face each other, with said liquid crystal layer composed of vertically aligned liquid crystal molecules interposed between said first and second substrates with each of said liquid crystal molecules controlled to a desired tilt angle corresponding to a voltage applied to said liquid crystal layer, in which the conditions of d·Δn·|Δ∈|$^2$≧5, d≦2.5, |Δ∈|≧7, and Δn>0.1 are satisfied such that a saturation voltage of the liquid crystal display is not more than 4.0 volts at a light wavelength of 550 nm, where d is the thickness in μm of said liquid crystal layer, Δn is the refractive index anisotropy of said vertically aligned liquid crystal molecules, and Δ∈ is the dielectric constant anisotropy of said vertically aligned liquid crystal molecules; and a driving circuit to impress a predetermined voltage on said reflection type liquid crystal display device, wherein, the relationship of d·Δn(eff)=λ/4 is satisfied, where λ is the wavelength of the light traversing the liquid crystal layer, d is the thickness in μm of said liquid crystal layer, Δn(eff) is the effective refractive index anisotropy of said vertically aligned liquid crystal molecules said driving circuit is so configured that a maximum drive voltage impressed on said reflection type liquid crystal display device is set in correspondence with the wavelength of light incident on said reflection type liquid crystal display device.

11. The display apparatus as set forth in claim 10, wherein said driving circuit is a variable voltage driving circuit to vary the maximum drive voltage impressed on said reflection type liquid crystal display device.

12. The display apparatus as set forth in claim 10, wherein said driving circuit is so set that the reflectance in reflection from said reflection type liquid crystal display device is maximized at said maximum drive voltage.

13. The display apparatus as set forth in claim 10, further comprising:

an upper liquid crystal alignment film spaced from the first substrate by the transparent electrode; and a lower liquid crystal alignment film abutting the second substrate and the light-reflecting electrode.

14. A projection system comprising:

a display unit comprising reflection type liquid crystal display devices disposed in respective correspondence which can modulate incoming predetermined polarized beams of a plurality of colors so that a polarization plane of said beams is optically rotated by a liquid crystal layer, each of said reflection type liquid crystal display devices comprising a first substrate provided with a light-transmitting electrode, and a second substrate provided with a light-reflecting electrode, said first and second substrates disposed in opposition to each other so that said light-transmitting electrode and said light-reflecting electrode face each other, with said liquid crystal layer composed of vertically aligned liquid crystal molecules interposed between said first and second substrates with each of said liquid crystal molecules controlled to a desired tilt angle corresponding to a voltage applied to said liquid crystal layer, in which the conditions of d·Δn·|Δ∈|$^2$≧5, d≦2.5, |Δ∈|≧7 and Δn>0.1 are satisfied such that a saturation voltage of the liquid crystal display is not more than 4.0 volts at a light wavelength of 550 nm, where d is the thickness in μm of said liquid crystal layer, Δn is the refractive index anisotropy of said vertically aligned liquid crystal molecules, and Δ∈ is the dielectric constant anisotropy of said vertically aligned liquid crystal molecules and the relationship of d·Δn(eff)=λ/4 is satisfied, where λ is the wavelength of the light traversing the liquid crystal layer, d is the thickness in μm of said liquid crystal layer, Δn(eff) is the effective refractive index anisotropy of said vertically aligned liquid crystal molecules;

a driving circuit to supply different maximum drive voltages to said reflection type liquid crystal display devices in said display unit; and a light source.

15. The projection system as set forth in claim 14, wherein said plurality of colors are three primary colors of red, green and blue, and said driving circuit is so configured that said maximum drive voltage impressed on said reflection type liquid crystal display device for red is the greatest of said maximum drive voltages.

16. The projection system as set forth in claim 14, wherein said plurality of colors are three primary colors of red, green and blue, and said driving circuit is formed on a silicon single crystal semiconductor substrate, and said maximum drive voltage supplied to said reflection type liquid crystal display device for red is not more than 6 V.

17. The projection system as set forth in claim 14, wherein said plurality of colors are three primary colors of red, green and blue, and said driving circuit is formed on a silicon single crystal semiconductor substrate, and said maximum drive voltage supplied to said reflection type liquid crystal display device for green is not more than 4 V.

18. The projection system as set forth in claim 14, further comprising:
- a separating optical system to subject light from a light source to color separation and outputting the color-separated beams to display units disposed in respective correspondence with said beams of said plurality of colors;
- a composing optical system to compose image beams obtained by said reflection type liquid crystal display devices in said display units; and
- a projection lens to project onto a screen an image composed by said composing optical system.

19. The projection system as set forth in claim 14, further comprising:
- an upper liquid crystal alignment film spaced from the first substrate by the transparent electrode; and
- a lower liquid crystal alignment film abutting the second substrate and the light-reflecting electrode.

20. A display apparatus comprising:
- a reflection type liquid crystal display device to modulate an incoming predetermined polarized light so that a polarization plane of said predetermined polarized light is optically rotated by a liquid crystal layer, said reflection type liquid crystal display device having a first substrate provided with a light-transmitting electrode, and a second substrate provided with a light-reflecting electrode, said first and second substrates disposed in opposition to each other so that said light-transmitting electrode and said light-reflecting electrode face each other, with said liquid crystal layer composed of vertically aligned liquid crystal molecules interposed between said first and second substrates with each of said liquid crystal molecules controlled to a desired tilt angle corresponding to a voltage applied to said liquid crystal layer, in which the conditions of $d \cdot \Delta n \cdot |\Delta \in|^2 \geq 5$, $d \leq 2.5$, $|\Delta \in| \geq 7$, and $\Delta n > 0.1$ are satisfied such that a saturation voltage of the liquid crystal display is not more than 4.0 volts at a light wavelength of 550 nm, where d (μm) is the thickness of said liquid crystal layer, $\Delta n$ is the refractive index anisotropy of said vertically aligned liquid crystal molecules, and $\Delta \in$ is the dielectric constant anisotropy of said vertically aligned liquid crystal molecules and the relationship of $d \cdot \Delta n(eff) = \lambda/4$ is satisfied, where $\lambda$ is the wavelength of the light traversing the liquid crystal layer, d (μm) is the thickness of said liquid crystal layer, $\Delta n(eff)$ is the effective refractive index anisotropy of said vertically aligned liquid crystal molecules; and
- a driving circuit to impress a predetermined voltage on said reflection type liquid crystal display device, wherein, said driving circuit is a variable voltage driving circuit to vary a maximum drive voltage impressed on said reflection type liquid crystal display device.

21. The display apparatus according to claim 20, further comprising:
- an upper liquid crystal alignment film spaced from the first substrate by the transparent electrode; and
- a lower liquid crystal alignment film abutting the second substrate and the light-reflecting electrode.

22. A projection system comprising:
- a display unit comprising reflection type liquid crystal display devices which can modulate an incoming predetermined polarized light so that a polarization plane of said predetermined polarized light is optically rotated by a liquid crystal layer, said reflection type liquid crystal display devices each comprising a first substrate provided with a light-transmitting electrode thereon, and a second substrate provided with a light-reflecting electrode, said first and second substrates disposed in opposition to each other so that said light-transmitting electrode and said light-reflecting electrode are opposed to each other, with said liquid crystal layer composed of vertically aligned liquid crystal molecules interposed between said first and second substrates with each of said liquid crystal molecules controlled to a desired tilt angle corresponding to a voltage applied to said liquid crystal layer, in which the conditions of $d \cdot \Delta n \cdot |\Delta \in|^2 \geq 5$, $d \leq 2.5$, $|\Delta \in| \geq 7$, and $\Delta n > 0.1$ are satisfied such that a saturation voltage of the liquid crystal display is not more than 4.0 volts at a light wavelength of 550 nm, where d is a value measured in μm is the thickness of said liquid crystal layer, $\Delta n$ is the refractive index anisotropy of said vertically aligned liquid crystal molecules, and $\Delta \in$ is the dielectric constant anisotropy of said vertically aligned liquid crystal molecules and the relationship of $d \cdot \Delta n(eff) = \lambda/4$ is satisfied, where $\lambda$ is the wavelength of the light traversing the liquid crystal layer, d (μm) is the thickness of said liquid crystal layer, $\Delta n(eff)$ is the effective refractive index anisotropy of said vertically aligned liquid crystal molecules; and
- a driving circuit to supply drive voltages to said reflection type liquid crystal display devices in said display unit, wherein said driving circuit is a variable voltage driving circuit to vary maximum drive voltages impressed on said reflection type liquid crystal display devices.

23. The projection system according to claim 22, further comprising:
- an upper liquid crystal alignment film spaced from the first substrate by the transparent electrode; and
- a lower liquid crystal alignment film abutting the second substrate and the light-reflecting electrode.

* * * * *